United States Patent [19]

Hanson et al.

[11] 4,433,894

[45] Feb. 28, 1984

[54] METHOD AND APPARATUS FOR GENERATING OPTICAL SCANS

[75] Inventors: Derald F. Hanson; Randy J. Sherman, both of Phoenix, Ariz.

[73] Assignee: Lincoln Laser Company, Phoenix, Ariz.

[21] Appl. No.: 320,331

[22] Filed: Nov. 12, 1981

[51] Int. Cl.³ .................................................. G02B 27/17
[52] U.S. Cl. ........................................ 350/6.8; 250/236
[58] Field of Search .......................... 350/6.5–6.91; 250/235, 236

[56] References Cited

U.S. PATENT DOCUMENTS

| | | | |
|---|---|---|---|
| 2,758,502 | 8/1956 | Scott et al. | 350/6.6 |
| 3,719,780 | 3/1973 | Gazard et al. | 350/6.91 |
| 3,897,132 | 7/1975 | Meeussen et al. | 350/6.7 |
| 3,973,826 | 8/1976 | Lobb | 350/6.8 |
| 4,030,806 | 6/1977 | Goshima et al. | 350/6.8 |
| 4,054,360 | 10/1977 | Oosaka et al. | 350/6.8 |
| 4,284,994 | 8/1981 | Radl | 350/6.8 |
| 4,304,459 | 12/1981 | Kramer | 350/6.7 |

FOREIGN PATENT DOCUMENTS

2053505  2/1981  United Kingdom .................. 350/6.6

*Primary Examiner*—Jon W. Henry
*Attorney, Agent, or Firm*—Cahill, Sutton & Thomas

[57] ABSTRACT

A system is disclosed for transforming a collimated beam of light, such as that generated by a laser, into a beam of light which repetitively scans a fixed path by utilizing a mirror which is repetitively rotated through a predetermined angular displacement. The angle between the mirror axis of rotation and the mirror position relative to the axis varies between subsequent mirror rotations and defines a scanning beam rotational axis error which is eliminated by the present invention. An input beam of collimated light is directed onto the rotating mirror along a first path to produce a first scanned reflected output beam for each rotation of the mirror. A second scanned reflected output beam is generated by redirecting the first scanned reflected output beam through a prism and back onto the mirror along a second path. The second path is vertically displaced from the first path by a distance related to the mirror rotational axis error. Each point at which the second scanned output beam intercepts the mirror is laterally offset from a corresponding point at which the input beam intercepts the mirror by a distance related to the relative angle between the mirror and the input light beam. The second scanned reflected output beam is reflected from the mirror to generate a third scanned reflected output beam for each deflection of the mirror. The repetitive deflections of the mirror produce a plurality of third scanned reflected output beams which define a grouping of non-coincident surfaces which are also nonintersecting with respect to the input beam. The third scanned reflected output beams are converged onto the fixed path such that the optical output beam repetitively scans the fixed path without any perceptible deviations caused by the mirror rotational axis error.

10 Claims, 23 Drawing Figures

_Fig. 8_

_Fig. 9_

_Fig. 10_

METHOD AND APPARATUS FOR GENERATING OPTICAL SCANS

BACKGROUND OF THE INVENTION

1. Field of the Invention

This invention relates to optical scanning methods and apparatus, and more particularly, to an optical scanning method and apparatus which eliminates the effect of deviations in the angle between a mirror and the rotational axis of the mirror. In optical scanning devices utilizing polygon mirrors, the error eliminated by the present invention is referred to as the facet to axis error.

2. Description of the Prior Art

Mirror to rotational axis error presents serious problems in the design of precision optical scanning systems. In optical scanners utilizing polygon mirrors, the mirror facets typically are ground with a facet to rotational axis error on the order of plus or minus thirty seconds. Up to the present time, it has been possible to achieve facet to axis error tolerances of on the order of plus or minus five seconds, but achieving such close tolerances is costly, time consuming and requires an extremely high level of skill. In some optical scanner applications, it is desirable to virtually eliminate the effects of the facet to axis error of the polygon mirror so that the scanned optical output signal retraces precisely the same path during each scan.

U.S. Pat. No. 3,897,132 (Meeussen) discloses a facet to axis error correction system for a rotating polygon mirror which utilizes a corner reflector mirror in combination with a positive lens. Column 4, lines 18-21 of this patent discloses that reflective prisms may be substituted for the reflective plane mirror surfaces. Because of the relative placement of the polygon mirror, the corner reflector mirror and the postive lens, the Meeussen optical scanning device generates a curved, scanned optical output beam.

Another device for eliminating or minimizing the facet to axis error in a polygon optical scanner is disclosed in U.S. Pat. No. 4,054,361 (Noguchi). In this device a beam of collimated light is passed through or reflected by a single optical element a first time to form a line image on the rotating polygon mirror. The reflected beam of light from the polygon mirror facet is passed through or reflected by the optical element a second time and the resulting collimated beam is passed through the image forming optical system to form a light spot on the image plane. As the polygon mirror is rotated, the light spot successively scans the image plane without any displacements of the scanning line resulting from facet to axis error.

Another system for eliminating the effects of facet to axis error is disclosed in U.S. Pat. No. 4,054,360 (Osaka). This device utilizes a polygon mirror in combination with three lenses and a planar mirror to generate a scanned optical output signal free of the effects of facet to axis errors.

U.S. Pat. Nos. 3,762,793 (Ullstig), 3,750,189 (Fleischer), 3,865,465 (Tatuoka) and 3,995,110 (Starkweather) disclose various types of optical scanning systems which utilize a first cylindrical lens positioned between a light source and a rotating polygon mirror and a second cylindrical lens positioned between the polygon mirror and a focusing lens to correct for the mirror facet to axis errors.

Another prior art system measures the facet to axis error of each mirror facet of a polygon mirror. The reflected output beam from the polygon mirror is passed through an acoustic modulator which is programmed to correct the deviation of the beam from each mirror facet by an amount precisely equal to the facet to axis error of each facet of the polygon mirror. This system is only capable of correcting for static errors and cannot correct dynamic facet to axis errors caused by polygon mirror support bearing deflections or thermally generated errors.

In another related prior art system, a feedback compensation system detects errors in the beam of light reflected from the leading edge of each facet of a rotating polygon mirror. A correction signal is generated which controls an acoustic modulator to compensate for non-repeatable, dynamic errors. This prior art feedback compensation system is not capable of correcting for facet to axis errors which take place during the scan of a mirror facet and therefore cannot completely eliminate facet to axis errors.

SUMMARY OF THE INVENTION

It is therefore a primary object of the present invention to provide an optical scanning method and apparatus which utilizes only one or a pair of inexpensive, fixed optical elements to completely eliminate the effect of facet to axis errors on the scanned optical output beam generated by the optical scanner.

Another object of the present invention is to provide an optical scanning method and apparatus which can generate either a linear or a curved scanned optical output beam.

Yet another object of the present invention is to provide an optical scanning method and apparatus which can be utilized in combination with an optical feedback system to scan a target and to detect defects in the target.

Still another object of the present invention is to provide an optical scanning method and apparatus fabricated from standard, commercially available components.

Still another object of the present invention is to provide an optical scanning method and apparatus which can correct for mirror to rotational axis errors of at least one half of one degree.

Briefly stated, and in accord with one embodiment of the invention, an optical scanner generates an optical output beam which repetitively scans a fixed path by utilizing a mirror which is repetitively rotated through a predetermined angular displacement. The angle between the mirror axis of rotation and the mirror varies between each mirror deflection and defines a mirror rotational axis error. An input light beam is directed onto the rotating mirror along a first path to produce a first scanned reflected output beam for each rotation of the mirror. A second scanned reflected output beam is generated during each rotation of the mirror by redirecting the first scanned reflected output beam through a prism and back onto the mirror along a second path. The second path is vertically displaced from the first path by a distance related to the mirror rotational axis error. Each point at which the second scanned reflected output beam intercepts the mirror is laterally offset from a corresponding point at which the input light beam intercepts the mirror by a distance related to the relative angle between the mirror and the input light beam. A third scanned reflected output beam is generated by reflecting the second scanned reflected output beam from the mirror. Repetitive rotations of the mirror produce a plurality of third scanned reflected output beams which define a grouping of non-coincident surfaces which are also non-intersecting with respect to the input light beam. The plurality of third scanned reflected output beams are converged onto the fixed path such that the optical output beam repetitively scans the fixed path without any perceptible effects caused by the mirror rotational axis error.

DESCRIPTION OF THE DRAWINGS

The invention is pointed out with particularity in the appended claims. However, other objects and advantages together with the operation of the invention may be better understood by reference to the following detailed description taken in connection with the following illustrations wherein:

DESCRIPTION OF THE PREFERRED EMBODIMENT

In order to better illustrate the advantages of the invention and its contributions to the art, a preferred hardware embodiment of the invention will now be described in some detail.

Figure 1:
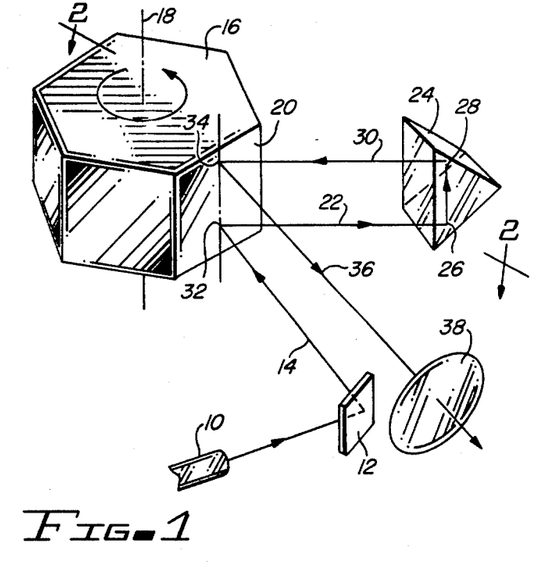
FIG. 1 is a perspective view of the elements of the optical scanner of the present invention.
Figures 2, 3:
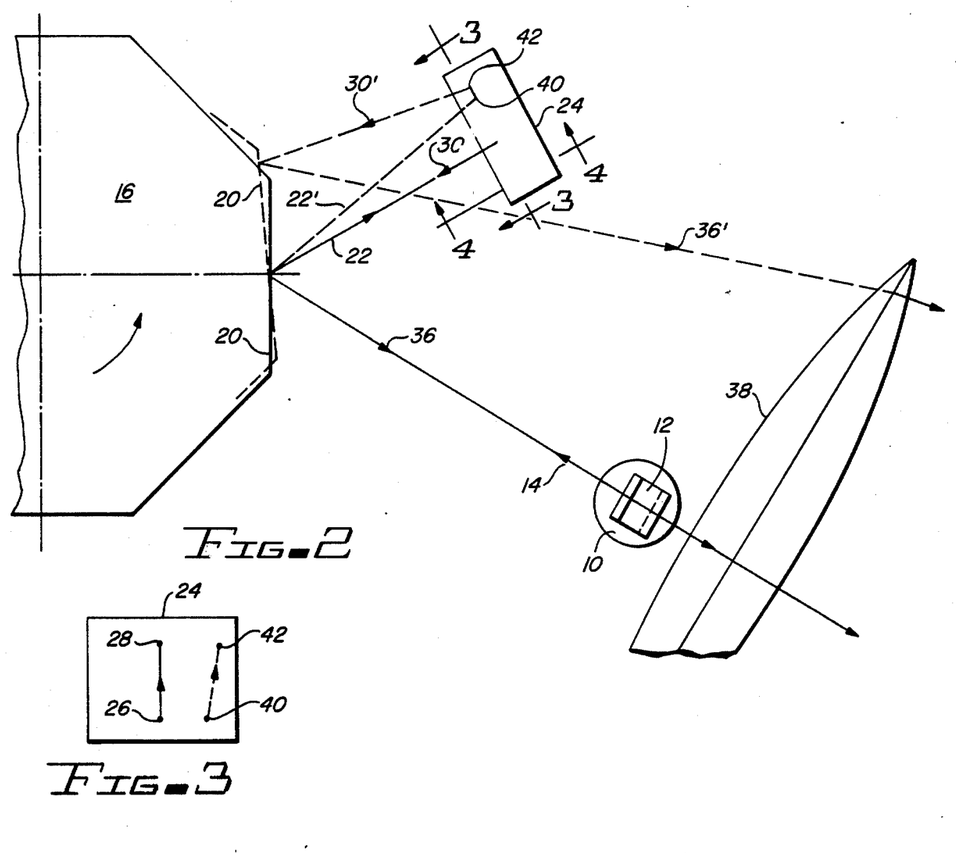
FIG. 2 is a view from above of the optical scanner illustrated in FIG. 1, taken along section line 2—2.
FIG. 3 is a sectional view of the prism illustrated in FIG. 2, taken along section line 3—3.

Referring now to FIGS. 1 and 2, a beam of collimated light is generated by a laser 10 or equivalent device. The collimated light beam is reflected by a relay mirror 12 to form an input light beam 14 which is directed onto the facets of a rotating polygon mirror 16. The rotational axis of mirror 16 is indicated by the vertically oriented line designated by reference number 18.

In FIG. 2, the solid line depiction of mirror facet 20 corresponds to a mirror facet positioned at the mid-point of a scan. The dotted line depiction of mirror facet 20 illustrates a further counter-clockwise rotational displacement of polygon mirror 16.

In the facet mid-position depicted in FIGS. 1 and 2, input light beam 14 strikes mirror facet 20 at a point equi-distant from the two vertical edges of the facet. The reflection of input light beam 14 from mirror facet 20 at this mid-position produces a first scanned reflected output beam 22 which is directed into the lower portion of the hypotenuse facet of an internal reflecting right angle prism 24. FIGS. 1 and 3 illustrate that first beam 22 is reflected upward by a first face of prism 24 at a point designated by reference number 26. This vertically oriented light beam then strikes the second face of prism 24 at a point designated by reference number 28 and is redirected back toward mirror facet 20 to form a second scanned reflected output beam designated by reference number 30. Since in FIGS. 1-3 mirror facet 20 is shown at its mid-position, the point designated by reference number 32 where input light beam 14 strikes mirror facet 20 and the point designated by reference number 34 where the second scanned reflected output beam 30 strikes mirror facet 20 are vertically aligned with one another.

Second scanned reflected output beam 30 is reflected at point 34 from the face of mirror facet 20 and generates a third scanned reflected output beam 36. The third scanned reflected output beam 36 is directed through converging means in the form of a positive lens 38 and is focussed onto a fixed path on a target which is repetitively scanned by the scanned output beam generated by the optical scanner.

Figure 4:
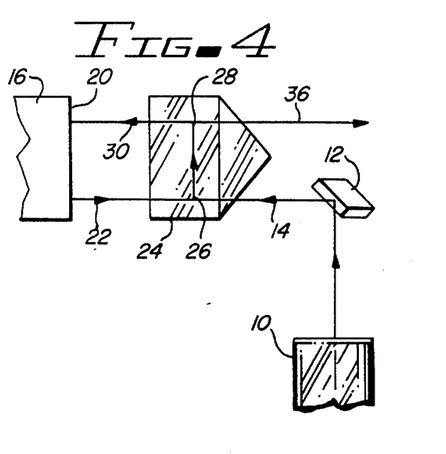
FIG. 4 is a sectional view of the optical scanner illustrated in FIG. 2, taken along section line 4—4.

FIG. 4 represents an elevational view of the optical scanner depicted in FIGS. 1 and 2 and illustrates that the horizontal axis of polygon mirror 16 and the midpoint of prism 24 are oriented in the same plane and are orthogonal to each other. Input light beam 14 travels below the third scanned reflected output beam 36. Since mirror facet 20 is illustrated as having a facet to axis error of zero, FIGS. 1 and 4 clearly depict that both input light beam 14 and first scanned reflected output beam 22 lie in the same horizontal plane while the second scanned reflected output beam 30 and the third scanned reflected output beam 36 lie in another horizontal plane.

The dotted line depiction of mirror 16 in FIG. 2 illustrates facet 20 at a point after it has been rotated beyond its mid-position. With this mirror facet rotational orientation, first scanned reflected output beam 22 is angularly deflected to a second position designated by reference number 22'. FIG. 3 illustrates that first scanned reflected output beam 22' strikes the lower surfacet of prism 24 at a point designated by reference number 40 and is deflected upward and laterally outward to a point designated by reference number 42 where the light beam is redirected back toward mirror facet 20 to form an angularly displaced second scanned reflected output beam designated by reference number 30'. Upon reflection from mirror facet 20, these rays become the third scanned reflected output beam 36 which is focussed by lens 38.

Figure 10A:
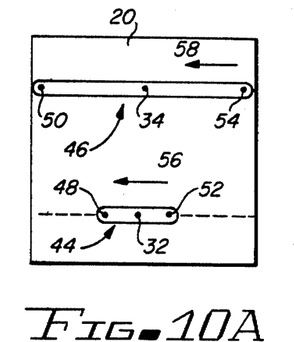
FIGS. 10A-C depict the first path of the input light beam and the second path of the second scanned reflected output beam for zero, negative and positive facet to axis errors.

FIG. 10A depicts the first path 44 travelled by input light beam 14 across the face of mirror facet 20 while reference number 46 depicts the second path which corresponds to the optical track of second scanned reflected output beam 30 across the face of mirror facet 20. As in FIG. 1, reference number 32 designates the point at which input light beam 14 strikes mirror facet 20 when mirror facet 20 is at its mid-position, while reference number 34 designates the point at which the corresponding second scanned reflected output beam 30 strikes mirror facet 20. Reference number 48 designates the position of input light beam 14 which generates a second scanned reflected output beam 30 at the lateral edge of mirror facet 20 as is designated by reference number 50. Reference numbers 52 and 54 designate corresponding positions of input light beam 14 and second scanned reflected output beam 30 at the beginning of a scanned output trace. The arrows designated by reference numbers 56 and 58 indicate the direction of travel of input light beam 14 and second scanned reflected output beam 30 across the face of mirror facet 20 which defines respectively a first path 44 and a second path 46.

FIG. 10A also indicates that input light beam 14 traces a path designated by the dotted line segments lying on either side of first path 44, but does not generate a first scanned reflected output beam 22 which intercepts the face of prism 24. These dotted line scan segments therefore correspond to dead time and do not create a usable scanned output signal. Because the third scanned reflected output signal is reflected twice from each mirror facet, its angular rate of deflection is effectively increased or "amplified." Third scanned reflected output beam 36 is angularly deflected at a rate four times faster than the rate of rotation of polygon mirror 16. Third scanned reflected output beam 36 is deflected by each mirror facet through the same arc as in a conventional optical scanner, although it is deflected through this arc in one half the time. The remaining scan time corresponds to the dead time depicted in FIG. 10A.

Figure 5:
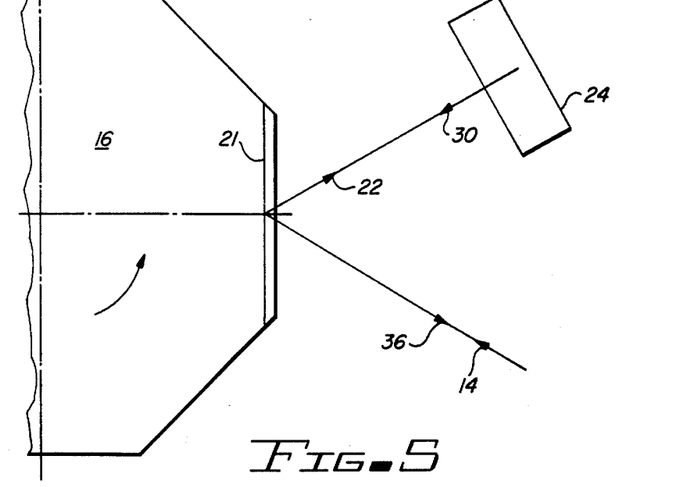
FIG. 5 is a view from above of an optical scanner utilizing a polygon mirror having a significant facet to axis error.
Figure 6:
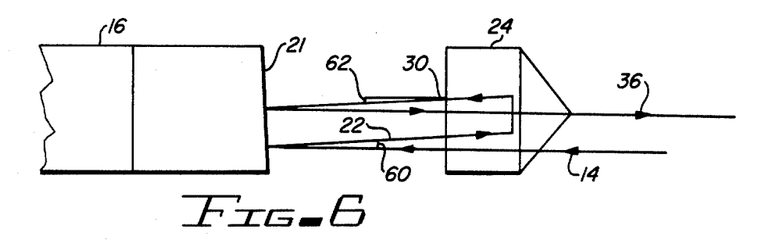
FIG. 6 is a view from the side of the optical scanner illustrated in FIG. 5, particularly illustrating the reflection error created by the mirror facet to axis error and the corrective effect of the prism on this error.

Referring now to FIGS. 5 and 6, input light beam 14 is incident upon mirror facet 21 of polygon mirror 16. Mirror facet 21 has a predetermined facet to axis error as is evidenced by the fact that the upper surface of facet 21 is closer to rotational axis 18 of mirror 16 than is the lower surface of mirror facet 21. This orientation of facet to axis error will be referred to as "negative error" since the surface of mirror facet 21 has essentially been rotated in a counterclockwise direction from a zero facet to axis error position. The term "positive error" will be utilized to refer to what is equivalent to a clockwise rotation of the surface of mirror facet 21 and occurs when the upper surface of mirror facet 21 is positioned at a greater distance from rotational axis 18 than the lower surface of mirror facet 21. FIGS. 5 and 6 depict mirror facet 21 at its rotational mid-position.

Since mirror facet 21 is no longer perpendicular to input light beam 14, first scanned reflected output beam 22 will be reflected upward at an angle equal to twice the negative error of mirror facet 21. In FIG. 6, reference number 60 indicates the upward deflection angle of first scanned reflected output beam 22 caused by the negative facet to axis error of mirror facet 21.

First scanned reflected output beam 22 is directed onto the hypotenuse face of prism 24 and is redirected through the prism toward mirror facet 21 to generate second scanned reflected output beam 30. The normal operation of prism 24 causes second scanned reflected output beam 30 to be precisely parallel to first scanned reflected output beam 22. While first scanned reflected output beam 22 had an error angle designated by reference number 60 which was displaced above a horizontal plane, second scanned reflected output beam 30 will have an error angle designated by reference number 62 which is equal but opposite to error angle 60. Thus prism 24 has effectively reversed the sign of the error angle so that when second scanned reflected output beam 30 is reflected a second time from the face of mirror facet 21 to generate third scanned reflected output beam 36, the error caused by this second reflection from the face of mirror facet 21 will exactly cancel the error induced by mirror facet 21 during the generation of the first scanned reflected output beam 22. The third scanned reflected output beam 36 will therefore be vertically displaced from, but precisely parallel to, input beam 14.

If we assume that input light beam 14 is horizontally oriented and define the angle between input light beam 14 and first scanned reflected output beam 22 to be equal to $+E$, the angle of second scanned reflected output beam 30 with respect to input light beam 14 will be equal to $-E$. Since the reflector of second scanned output beam 30 from mirror facet surface 21 will add an error equal to $+E$ to second scanned output beam 30, the following angular reorientation will take place as beam 30 is reflected to become beam 36:

$$-E + E = 0$$

The above equation mathematically confirms the parallel alignment between input beam 14 and third scanned reflected output beam 36. For any given positive or negative facet to axis error, prism 24 will in all cases reverse the sign of the facet to axis error as it generates the second scanned reflected output beam 30. This error is then cancelled out by a second reflection of the light beam from the mirror facet being scanned. The result in all cases will be the generation of a third scanned reflected output beam 36 which is parallel to, but spaced apart from input light beam 14.

Thus repetitive deflections of input light beam 14 by the facets of polygon mirror 16 generate or define a family or grouping of non-coincident surfaces each of which is defined by the deflection of third scanned reflected output beam 36 from each mirror facet. These family of surfaces are also non-intersecting with respect to input light beam 14 as a result of the upward translation of the light beam as it passes through prism 24.

Figure 10B:
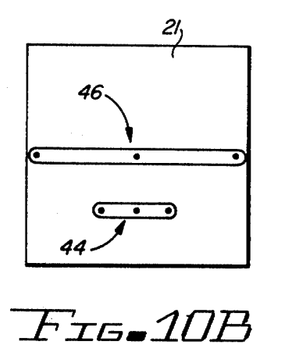

FIG. 10B depicts the downward displacement of second path 46 along the face of facet 21 caused by the negative facet to axis error of facet 21 as illustrated in FIGS. 5 and 6.

Figure 10C:
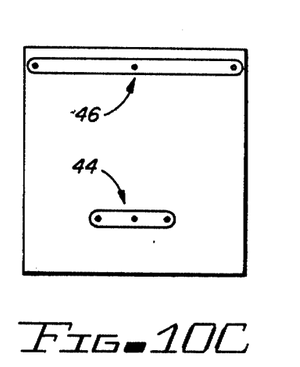
Figure 11A:
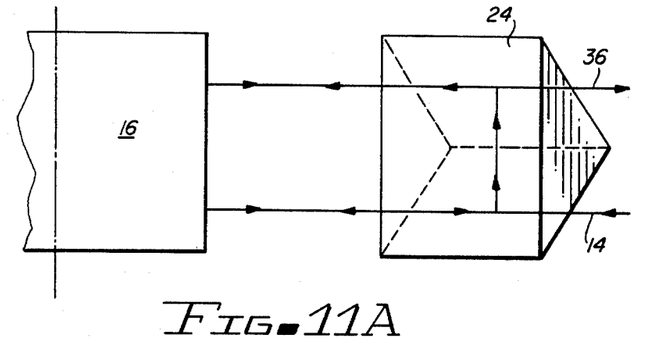
FIGS. 11A-C correspond respectively to FIGS. 10A-C and depict the travel path of the various light beams between the polygon mirror and the prism of the optical scanner.
Figure 11B:
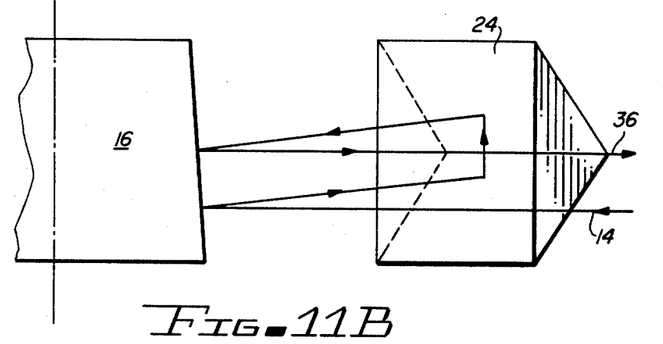
Figure 11C:
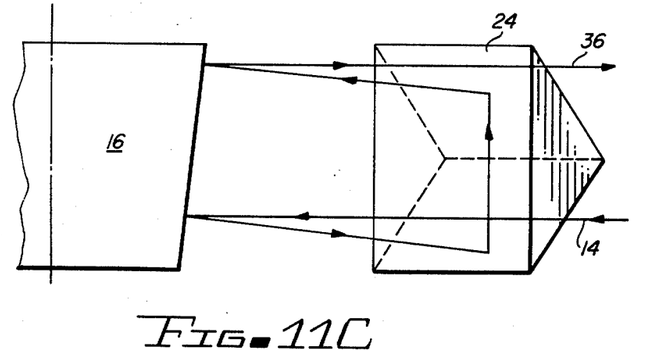
Figure 12:
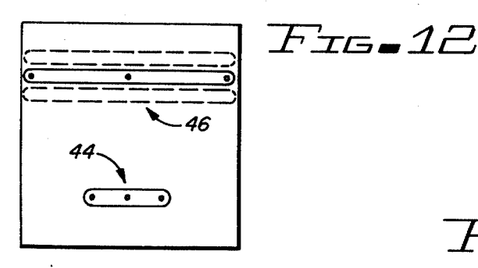
FIG. 12 depicts a family of non-coincident surfaces of the type which might be created by facet to axis errors in the optical scanner embodiment depicted in FIG. 1.

FIG. 10C depicts the upward displacement of second path 46 along the face of a mirror facet caused by a positive facet to axis error. FIGS. 11A-C correspond respectively to FIGS. 10A-C and depict the facet to axis error and the effect of that error on the spacing between the first and second paths traced across the respective mirror facet.

As is clearly evident from an inspection of FIGS. 10A-C and 11A-C, the optical scanning system of the present invention can accommodate facet to axis errors up to a predetermined limit. Beyond that limit, the second path travelled by the second scanned reflected output beam will be displaced either above or below the mirror facet and the optical scanning system will cease to function. It is estimated that the optical scanning system of the present invention can accommodate facet to axis errors of at least plus or minus five degrees. An optical scanner which utilizes a polygon mirror having an increased vertical dimension in combination with a larger prism may be able to accommodate even larger facet to axis errors.

Figure 7:
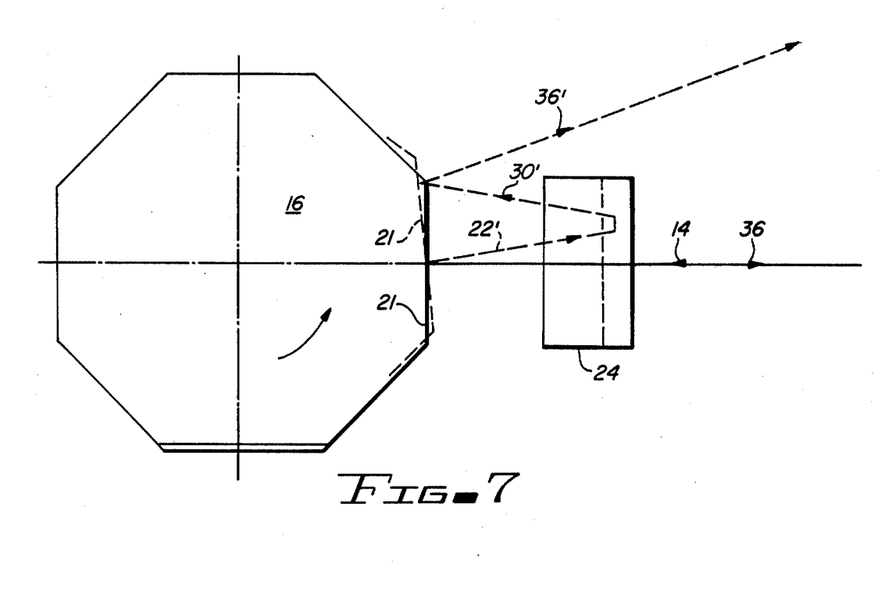
FIG. 7 is a second view of the optical scanner illustrated in FIG. 5, particularly illustrating the polygon mirror rotated in a counterclockwise direction from the neutral position illustrated in FIG. 5.
Figure 8:
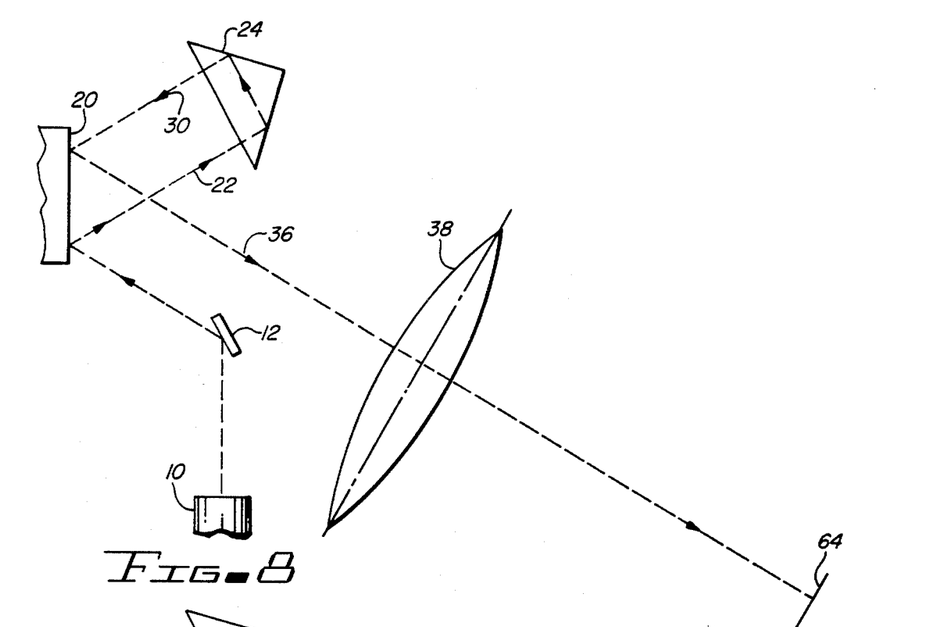
FIG. 8 is an elevational view of a second embodiment of the optical scanner of the present invention, particularly illustrating the path travelled by the optical beam when the facet to axis error of the polygon mirror is equal to zero.
Figures 9, 10:
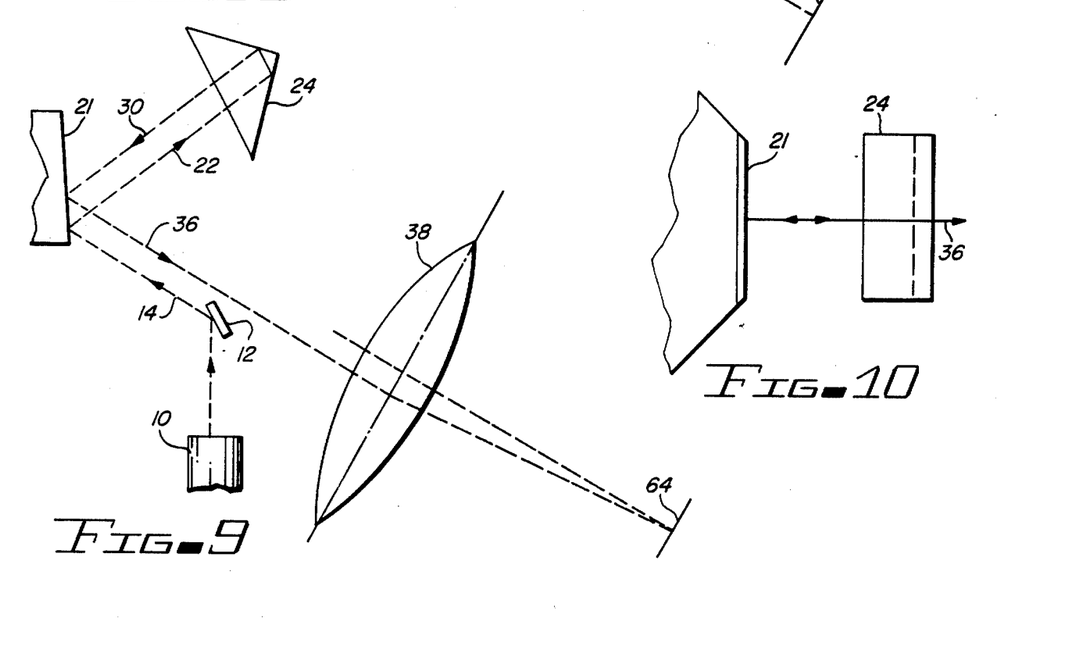
FIG. 9 is an elevational view of a second embodiment of the optical scanner of the present invention, particularly illustrating the path travelled by the optical beam when a significant facet to axis error exists.

Referring now to FIGS. 7-10, a second embodiment of the optical scanner of the present invention will be described. This second embodiment utilizes a prism 24 which is positioned above the plane of polygon mirror 16 and converging means in the form of positive lens 38 which is positioned below the plane of polygon mirror 16. Laser 10 and relay mirror 12 are also positioned below the plane of polygon mirror 16. Similar reference numbers have been utilized in connection with the illustration of this second embodiment to indicate similar structural elements of the optical scanner. FIGS. 7 and 8 illustrate the operation of this second embodiment of the optical scanner when a mirror facet 20 is presented which includes a facet to axis error equal to zero. FIGS. 9 and 10 depict the relative relationships between input light beam 14 and the various scanned reflected output beams caused by a mirror facet 21 having a negative facet to axis error.

Figure 13:
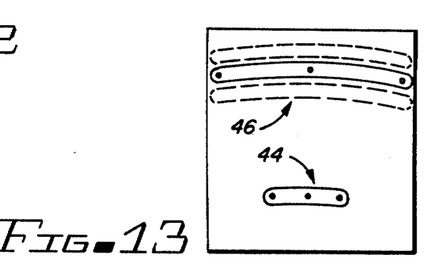
FIG. 13 depicts a curved family of non-coincident surfaces of the type which might be created by facet to axis errors in the optical scanner embodiment depicted in FIG. 8.

FIG. 13 illustrates that the modified positioning of the various elements of this second embodiment of the optical scanner causes input light beam 14 to generate a curved first path 44 on the rotating facet of the polygon mirror. For the same reason, second scanned reflected output beam 30 will trace a family of curved, non-intersecting surfaces on the rotating facets of the polygon mirror. The family of curved third scanned reflected output beams 36 pass through positive lens 38 which is designed to cause the family of parallel oriented, non-intersecting surfaces to converge into a single curved scanned output beam which is repetitively scanned across target 64.

Prism 24 is a conventional internal reflecting right angle prism in which the adjacent sides of the prism have a tolerance of plus or minus one tenth of one wavelength. In the preferred embodiment of the invention, prism 24 has a one inch hypotenuse face span and a width of three quarters of an inch from end to end. The hypotenuse face should include an anti-reflective coating to prevent unwanted reflection of first scanned output beam 22. Alternatively, prism 24 may be slightly rotated with respect to rotational axis 18 of mirror 16 or it may be fabricated with a slight pyramidal error in the hypotenuse to prevent unwanted reflections.

In both the FIG. 1 and FIG. 9 embodiments, the angle defined by a line extending from prism 24 to mirror facet 20 to positive lens 28 is equal to sixty degrees. Prism 24 is spaced thirty degrees above or laterally away from a line perpendicular to the facet of polygon mirror 16, while positive lens 38 is positioned on a line displaced laterally or below that same perpendicular line. Lens 38 is spaced away from polygon mirror 16 as required to insure that it collects and refracts the most widely deflected third scanned reflected output beam 36. As is evident from FIG. 2, prism 24 must be positioned so that its lower edge does not interfere with the most widely deflected third scanned reflected output beam 36. Once the spacing between lens 38 and the target of the scanned optical output beam have been determined, the refracting power of lens 38 can be set to precisely converge the scanned optical output beam on the target.

In the preferred embodiment of the present invention, a twenty-four sided rotating mirror having a 4.75 inch spacing between opposing facets and a facet height of one inch is utilized.

Figure 14:
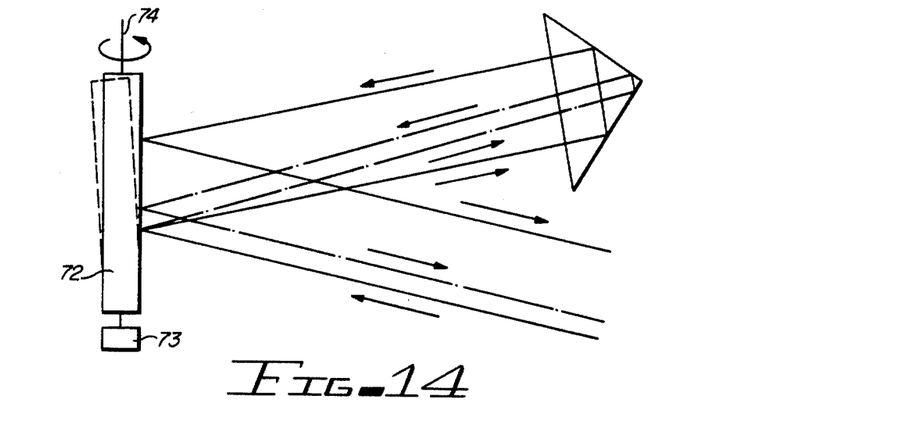
FIG. 14 depicts the configuration of an optical scanner incorporating a planar mirror which is rotated back and forth within a defined arc by a galvanometer movement coupled to the mirror.

FIG. 14 depicts a planar mirror 72 which is deflected or rotated back and forth within a defined arc by a galvanometer movement 73 coupled to the mirror. The compensation system of the present invention will eliminate variations in the angle between the plane of mirror 72 and its axis of rotation 74 as the mirror is rotated. The errors imparted to the galvanometer driven mirror are equivalent to facet to axis errors in a polygon mirror system and are therefore eliminated by the present invention. The dotted line representation of mirror 72 illustrates the type of mirror position errors corrected by the present invention.

In yet another embodiment of the invention, one may utilize a single mirror facet coupled to the edge of a rotating disc. Dynamic displacement of the mirror facet will generate rotational axis errors equivalent to the facet to axis error discussed above and will be eliminated by the present invention. The present invention will also eliminate facet to axis errors created by mirrors rotated by other means such as a tuning fork, a cam or other rotating device.

Figures 15, 16:
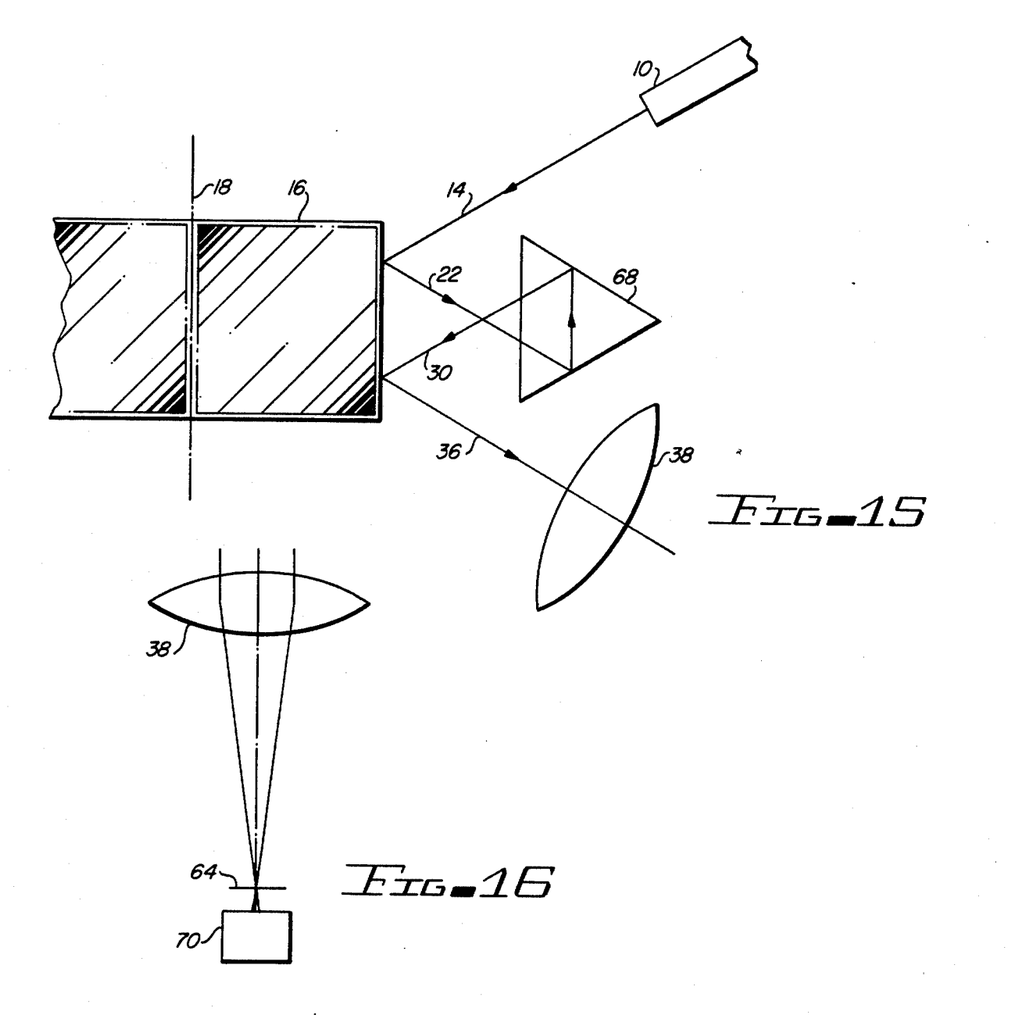
FIG. 15 illustrates an embodiment of the optical scanner incorporating an equilateral prism.
FIG. 16 depicts an optical scanning system which includes a detector for measuring the effect of a target on the scanned optical output beam.

FIG. 15 depicts another configuration of the optical scanner in which an equilateral prism 68 is substituted for a ninety degree prism. As indicated, laser 10, prism 68 and positive lens 38 must be repositioned to permit the optical scanner to function in accordance with the teachings of the present invention. Various other prism configurations can be utilized if the input light source, lens and prism are properly positioned with respect to polygon mirror 16.

Referring now to FIG. 16, target 64 comprises an optically transmissive surface scanned by the optical output beam. An optical detector 70 can be positioned adjacent the rear surface of target 64 as illustrated in FIG. 16 or, alternatively, can be positioned to receive light reflected from the scanned surface of target 64. Detector 70 measures variations in the intensity of the transmitted or reflected beam to detect imperfections in the surface of target 64, to read information stored on target 64 or to accomplish various other functions which are well known to those skilled in the art.

Figure 17:
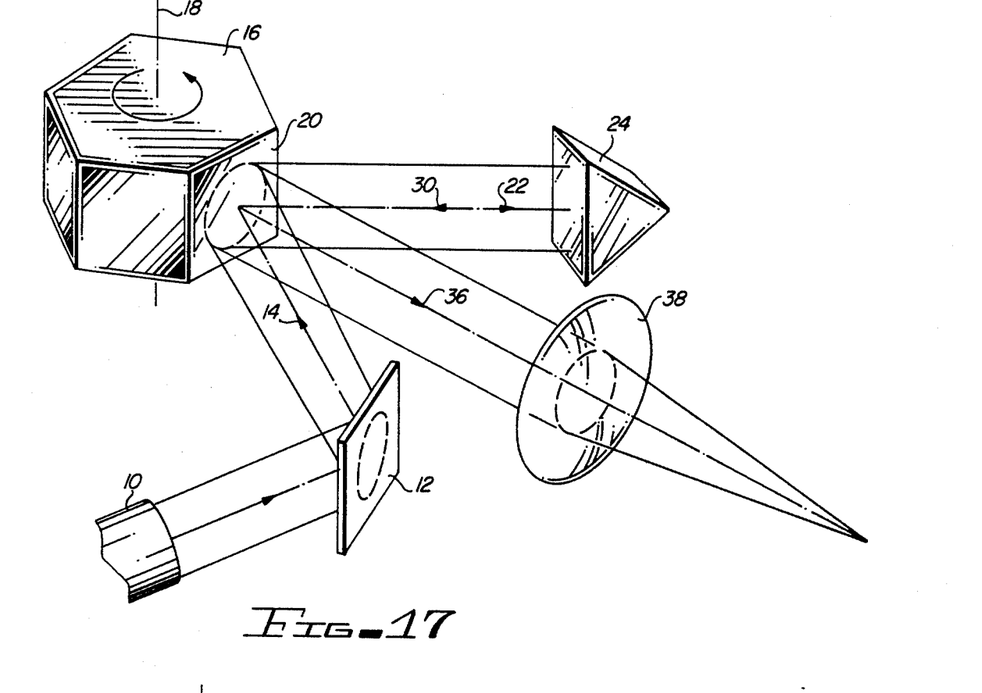
FIG. 17 illustrates an optical scanner which converts a large diameter input light beam into a scanned optical output beam.

FIG. 17 illustrates that the optical scanning system of the present invention may utilize a broad input beam 14 having a diameter on the order of the facet height of polygon mirror 16. The first scanned reflected output beam 22 and the second scanned reflected output beam 30 are essentially coincident with one another, but travel in opposing directions. The third scanned reflected output beam 36 is directed through and converged by positive lens 38 exactly as has been described above.

The optical scanner of the present invention may be used as an element of an image generating device. In this configuration, the intensity of the output signal from laser 10 is modulated as the scanned output signal from the optical scanner is deflected across a photosensitive material. The photosensitive material is displaced at the end of each scan so that an entire image can be rapidly recreated on the photosensitive surface.

Figure 18:
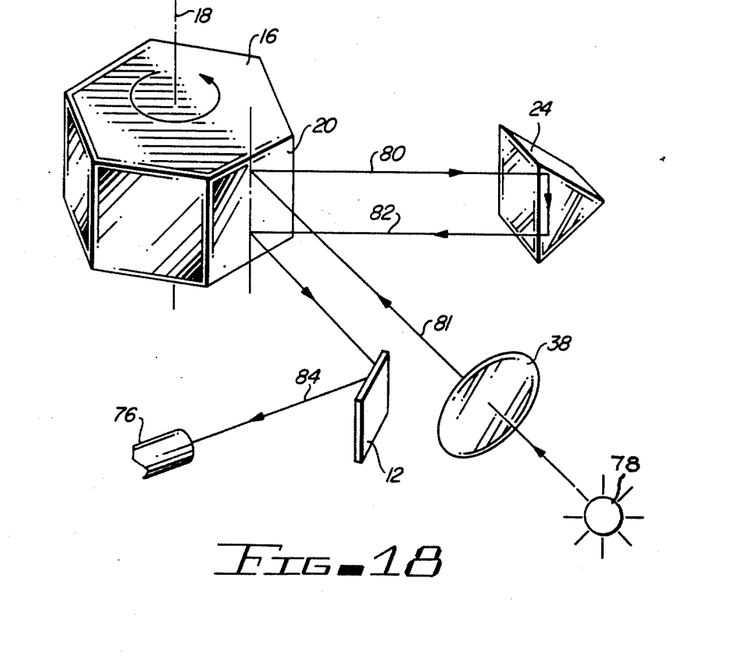
FIG. 18 illustrates an optical scanning device which is configured to function as a receiver to detect photon sources lying within the scanner field of view.

FIG. 18 indicates that a detector 76 can be substituted for laser 10. In this configuration, the optical scanner of the present invention functions as a receiving device to indicate the presence, intensity and azimuth of a photon source 78 which lies within the scanner field of view. The scanner field of view is defined by the various mirror parameters, but in a high speed polygon mirror scanner having twenty-four facets, the field of view may be on the order of fifteen degrees. A synchronization circuit is typically coupled to the rotating mirror in order to determine the relative angular position of the mirror during each scan for the purpose of indicating the azimuth of photon source 78.

Detector 76 normally includes an image intensification device such as a telescope and a beam collimator in combination with a photon detector which is sensitive to the wavelength or range of wavelengths of interest. In the receiving mode, positive lens 38 collects and converges the diverging radiant energy rays from source 78 into a substantially collimated beam 81 and directs that collimated beam onto the surface of mirror facet 20. The reflection of the collimated beam from the surface of mirror facet 20 produces a first scanned reflected collimated beam 80 which travels into prism 24. Prism 24 redirects the first scanned reflected collimated beam 80 back onto the surface of mirror facet 20 along a second path to generate a second scanned reflected collimated beam 82. The second scanned reflected collimated beam 82 is reflected again from the surface of mirror facet 20 and is directed into detector 76. Reference number 84 designates the output beam which is reflected from relay mirror 12 and directed into detector 76. Output beam 84 maintains a constant angular position with respect to the vertical plane of the optical scanner as a result of the facet to axis error correction compensation system of the present invention.

FIGS. 10A-C, 11A-C and FIG. 12 are directly analogous to the operation of the optical scanner receiver depicted in FIG. 18 except that the arrows indicating the direction of travel of the various optical beams in FIG. 11 must be reversed.

It will be apparent to those skilled in the art that the disclosed optical scanner may be modified in numerous other ways and may assume many other embodiments in addition to the various preferred forms specifically set out and described above. Accordingly, it is intended by the appended claims to cover all such modifications of the invention which may fall within the true spirit and scope of the invention.

I claim:

1. A method for generating an optical output beam which repetitively scans a fixed straight path on a target by utilizing a rotating polygon mirror including a plurality of mirror facets, wherein the vertical angle of the mirror facets varies and defines a facet to axis error for each mirror facet, said method comprising the steps of:
   a. directing an input beam of collimated light onto the facets of the rotating polygon mirror along a first path lying within a plane oriented perpendicular to the rotational axis of said mirror to produce a first scanned reflected output beam as each facet of said polygon mirror is rotated past the input light beam;
   b. generating a second scanned reflected output beam by redirecting the first scanned reflected output beam through a prism and back onto said mirror facet along a second path, the second path being vertically displaced from the first path by a distance related to the facet to axis error, each point at which the second scanned reflected output beam intercepts said mirror facet being laterally offset from a corresponding point at which the input beam intercepts said mirror facet by a distance related to the facet to axis error wherein the hypotenuse facet of said prism is oriented parallel to the rotational axis of said mirror and wherein the roof edge of said prism lies within a plane positioned between the first and second scanned reflected output beams and oriented perpendicular to the rotational axis of said mirror;
   c. generating a third scanned reflected output beam by reflecting the second scanned reflected output beam from said mirror facet, wherein the plurality of third scanned reflected output beams generated by the sequentially rotated facets of said polygon mirror are scanned through parallel, non-coincident paths; and
   d. converging the plurality of third scanned reflected output beams onto the fixed straight path such that the optical output signal repetitively scans the fixed path to thereby eliminate all facet to axis errors for said polygon mirror.

2. The method of claim 1 wherein said prism is a ninety degree prism and wherein the hypotenuse face of said prism receives the first scanned reflected output beam.

3. The method of claim 1 wherein the plurality of third scanned reflected output beams are converged by a positive lens.

4. The method of claim 3 including the further step of directing the scanned output beam onto a target.

5. The method of claim 4 including the further step of measuring the effect of said target on said output beam as said output beam scans said target.

6. An optical scanner for generating an optical output beam which repetitively scans a fixed straight path on a target by utilizing a rotation polygon mirror including a plurality of mirror facets wherein the vertical angle of the mirror facets varies and defines a facet to axis error for each mirror facet, said apparatus comprising:
   a. means for directing an input beam of collimated light onto the facets of the rotating polygon mirror along a first path lying within a plane oriented perpendicular to the rotational axis of said mirror to produce a first scanned reflected output beam as each facet of said polygon mirror is rotated past the input light beam;
   b. a prism for redirecting the first scanned reflected output beam back onto the mirror facet illuminated by the input light beam along a second path to generate a second scanned reflected output beam, the second path being vertically displaced from the first path by a distance related to the facet to axis error, each point at which the second scanned reflected output beam intercepts said mirror facet being laterally offset from a corresponding point at which the input beam intercepts said mirror facet by a distance related to the facet to axis error wherein the hypotenuse face of said prism is oriented parallel to the rotational axis of said mirror and wherein the roof edge of said prism lies within a plane positioned between the first and second scanned reflected output beams and oriented perpendicular to the rotational axis of said mirror;

c. generating a third scanned reflected output beam by reflecting the second scanned reflected output beam from said mirror facet, wherein the plurality of third scanned reflected output beams generated by the sequentially rotated facets of said polygon mirror are scanned through parallel, non-coincident paths; and d. a positive lens for converging the plurality of third scanned reflected output beams onto the fixed straight path such that the optical output signal repetitively scans the fixed path to thereby eliminate all facet to axis errors for said polygon mirror.

7. The optical scanner of claim 6 wherein said prism is a ninety degree prism and wherein the hypotenuse face of said prism receives the first scanned reflected output beam.

8. The optical scanner of claim 6 wherein the diameter of the input beam is greater than fifty percent of the facet height of said polygon mirror.

9. The optical scanner of claim 6 further including means for directing the scanned output beam onto a target.

10. The optical scanner of claim 9 further including means for measuring the effect of said target on said output beam as said output beam scans said target.

* * * * *

UNITED STATES PATENT AND TRADEMARK OFFICE
CERTIFICATE OF CORRECTION

PATENT NO. : 4,433,894
DATED : 2/28/84
INVENTOR(S) : Derald F. Hanson; Randy J. Sherman It is certified that error appears in the above-identified patent and that said Letters Patent are hereby corrected as shown below:

Claim 6, at Column 10, line 53, please delete "rotation" and insert --rotating--.

Claim 6 at Column 11, lines 13-15, please delete "c. generating a third scanned reflected output beam by reflecting the second scanned reflected output beam from said mirror facet," and insert --means for reflecting the second scanned reflected output beam from said mirror facet to generate a third scanned reflected output beam,--

Signed and Sealed this

Twenty-seventh Day of May 1986

[SEAL]

Attest:

DONALD J. QUIGG

Attesting Officer

Commissioner of Patents and Trademarks